Dec. 13, 1960   H. L. STOWERS   2,963,873
METHOD AND APPARATUS FOR STORING LIQUEFIED GASES
Filed July 10, 1957
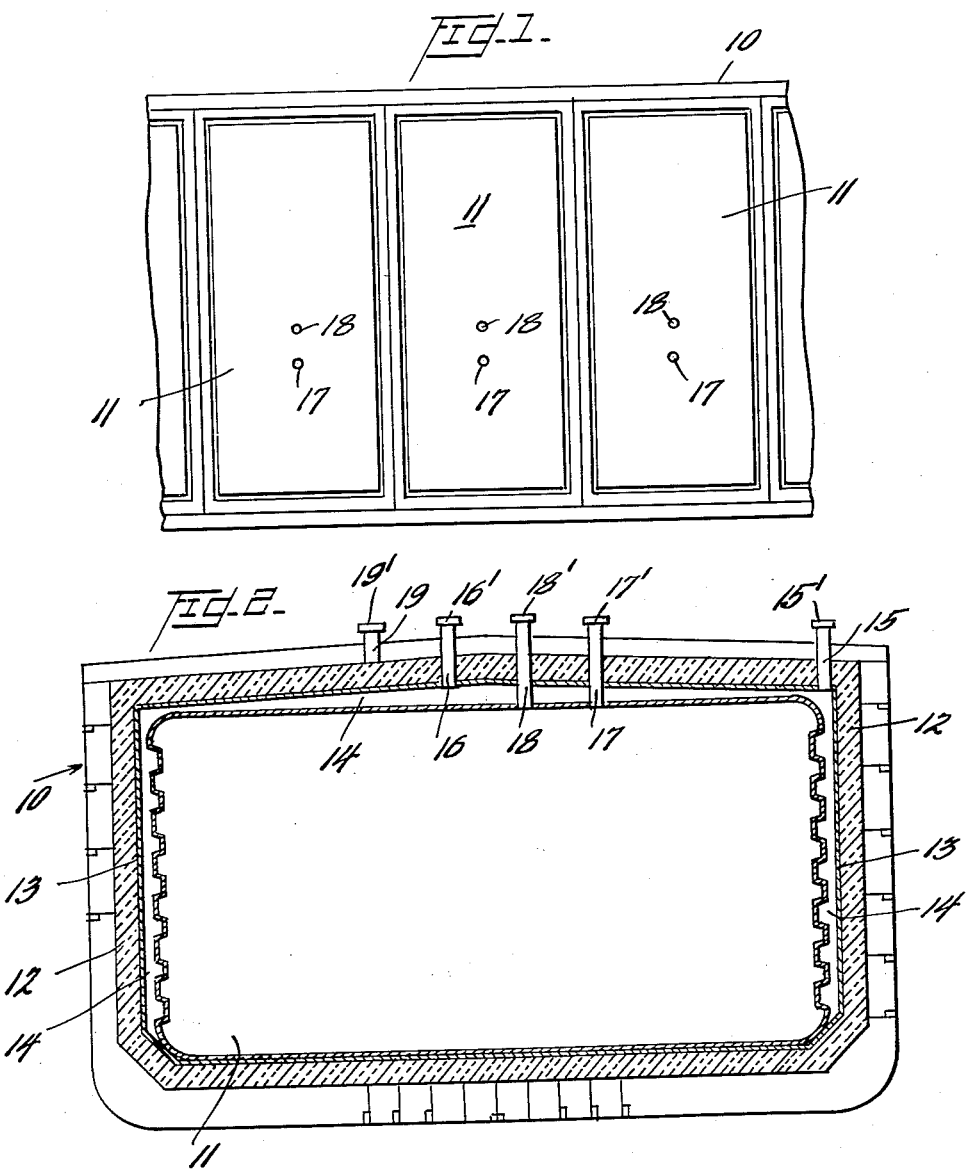
INVENTOR
Herbert Lee Stowers
BY
Watson, Cole, Grindle + Watson
ATTORNEYS

United States Patent Office 2,963,873
Patented Dec. 13, 1960

2,963,873

METHOD AND APPARATUS FOR STORING LIQUEFIED GASES

Herbert Lee Stowers, Owensboro, Ky., assignor to Texas Gas Transmission Corporation, Owensboro, Ky., a corporation of Delaware Filed July 10, 1957, Ser. No. 670,972

6 Claims. (Cl. 62—45)

This invention relates to the storage and transportation of liquids at low temperatures and pressures and more particularly to a method of, and apparatus for, the storage of liquefied gases. While the invention may be found to be particularly advantageous in connection with the transportation of such liquefied gases, it is also adapted to stationary storage receptacles and methods and is not intended to be limited to use in connection with vessels or vehicles for the transportation of liquefied gases.

The general object of the invention is the provision of a method, and an apparatus, for the efficient and safe transportation or stationary storage of liquefied natural and petroleum gases such as methane, ethane, propane and butane or mixtures of some or all of these gases. The invention is suitable for use in connection with any gas which must be cooled and held at a low temperature in order that it may be liquefied and stored as a liquid.

In order to liquefy gas, its temperature must be reduced to the boiling point of the particular gas at any given pressure. For example, methane must be reduced to a temperature of —258° F. at a pressure of 14.7 p.s.i.a. (atmospheric pressure) in order to be liquefied. This temperature must be maintained if the gas is to be held in storage in a liquid state. The present invention relates to a method and apparatus for storage of the gas, and not to the methods or apparatus involved in its liquefaction.

Tanks for storing any liquid, hot or cold, must of course be built at ambient temperatures from materials suitable for the service for which they are intended. Normally, the tanks for storing liquefied gases are constructed of a suitable metal, usually an aluminum alloy or nickel alloy steel. Like most other materials suitable for tank construction, these metals shrink very materially in size as their temperature is reduced to low values. Since the boiling points of the natural and petroleum gases ars quite low, the tanks used for storage and transportation of such gases are subject to quite substantial shrinkage, which causes a serious problem in that it causes the tank to draw away from the solid insulation with which it must be surrounded in order to assist in maintaining the gas in its liquefied state. If additional solid insulation is supplied after the tank has contracted due to the extreme low temperature of the liquefied gas within it, all of this additional solid insulation must be removed as the gas is withdrawn, in order that the tank may expand to its normal size at ambient temperatures. This arrangement is obviously cumbersome and impractical.

Moreover, since the aforesaid shrinkage deprives the storage tank of the mechanical support normally supplied by the solid insulation surrounding it, and the retaining structure for the solid insulation, such tanks have to be more heavily constructed than would otherwise be the case, thus increasing their cost. The increase in weight due to such heavier construction also, necessarily, increases the cost of transporting liquefied gases.

Another disadvantage inherent in the use of a tank which shrinks out of contact with its surrounding solid insulation lies in the fact that, when used for transportation of the material stored, such tanks may shift within the vessel or vehicle, causing damage or destruction to the tank, vehicle, or both, as well as loss of the cargo.

In order to overcome the aforesaid disadvantages, and others of less importance, it is an object of the present invention to provide a method of storing liquefied gases comprising the steps of cooling a storage container, made of heat conductive material, to approximately the boiling point of the liquefied gas to be stored, introducing the said liquefied gas into such container, and simultaneously forming a supporting layer of normally fluid material about the exterior side walls of said container by introducing into a peripheral space surrounding said walls a normally fluid material having a freezing point above, or at least not substantially lower than, the boiling point of the said liquefied gas, and maintaining said normally fluid material in contact with said side walls, said supporting layer being increased in height correspondingly as the level of liquefied gas within the container rises, whereby the material of the supporting layer becomes sufficiently transformed toward its solid phase to provide substantial mechanical support for the side walls of the container.

The normally fluid material introduced into the peripheral space surrounding the container may consist of a liquefied gas, or a mixture of such gases, having a freezing point not lower than the boiling point of the liquefied gas within the container, or it may consist of a material, such as oil, which has a very high viscosity at temperatures approximating the boiling point of the liquefied gas within the container. Whether frozen or highly viscous, the surrounding layer will always provide a substantial measure of insulation for the container, thus supplementing the usual solid insulation in this respect as well as mechanically.

Another object of the invention is the provision of a device for the storage of liquefied gases comprising an inner container made of heat-conducting material which contracts when cooled, an outer container, an envelope of solid heat insulating material within said outer container and surrounding the inner container, filler and vent means for said inner container, and filler and vent means communicating with a space between the outer walls of said inner container and the inner surface of said envelope of insulating material. The provision of a device of this character enables the simultaneous filling of the inner container with the liquefied gas to be stored, and filling of the peripheral space between the outer walls of the inner container and the inner surface of the insulating envelope with a suitable material, constituting the aforesaid supporting layer.

Other and further objects, features and advantages will be apparent from the description which follows, read in connection with the accompanying drawings in which Figure 1 is a fragmentary plan view of a vehicle or vessel (in the present case, a ship) for transporting liquefied gases according to the invention, with the solid insulation and outer coverings removed from the top to expose the storage tanks; and Figure 2 is a transverse vertical sectional view of the device of Figure 1, on a somewhat larger scale.

In order to facilitate an understanding of the invention, reference is made to the embodiments thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Referring to the drawings, the numeral 10 designates the hull of a ship, whose constructional details form no part of the present invention. A storage tank 11 constructed of any suitable material, for example stainless steel, is supported within the hull 10 and is completely surrounded by a rather heavy layer 12 of solid insulation such as foam glass, balsa wood, mineral wool, or the like. For reasons to be explained, the solid insulation should be impervious to the liquid or ice insulation which may come in contact with it. If desired, a membrane 13 may be provided to separate the solid insulation and the liquid insulation to be described. This membrane may be made of a variety of materials depending upon the temperatures and stress to which it may be subjected. If the membrane is near a liquefied methane tank, where it may be subjected to temperatures as low as —250° F., a soft dry wood may be used, such as balsa wood, white fir and perhaps others. Planks of this wood with special joints, such tongue and groove, may be used and where necessary may be shingled with strips of aluminum foil overlapping and covering the joints. Some leakage of liquid insulator may be allowed into the solid insulation as the latter should be impervious to the liquid insulator. Means may be provided to drain out the liquid insulation as a gas or as a liquid from various parts of the solid insulation chamber.

In all cases, regardless of the temperature of the liquid stored, the outer layers of insulation next to the hull of the vessel (or the other vehicle wall) may be cemented together in the conventional manner and membranes of conventional material may be used at intervals in the various layers of insulation inward to a point where the insulation does not reach a temperature below approximately —50° F. For temperatures below this point, loose blocks or pieces of insulation may be used, or these blocks of material may be surrounded by liquid insulation. It does not appear practical to allow the liquid insulation to solidify except in the space around the inner tank and perhaps in the first layer or two of solid insulation.

It will be seen that the tank 11 is somewhat smaller than the space within the membrane 13, the tank 11 being represented as having contracted due to a reduction in temperature to a value corresponding to the boiling point of the liquid gas to be transported or stored. The tank 11 may have corrugated sides, as illustrated, or plain sides, the details of construction of the tank 11 being outside of the present invention. The space 14 separating the side walls and top of the tank 11 from the membrane 13 is connected to atmosphere by conduits 15 and 16, provided with removable closures 15' and 16', respectively. The conduits 15 and 16 may serve as filler and vent, respectively, or either or both of them may serve as filler and vent. Similarly, the tank 11 is connected to atmosphere by conduits 17 and 18 provided with removable closures 17' and 18', respectively, to serve as filler and vent means for the tank 11. The conduit or passageway 19, having a removable closure 19', provides access to the space occupied by the solid insulation 12.

In accordance with the method of the present invention the liquefied gas to be stored or transported, for example methane, is filled into the tank 11 through one or both of the conduits 17 and 18. Methane having a boiling point of —258° F. at atmospheric pressure, it is suitable to use, as a normally fluid material to be filled into the space 14, normal butane which has a freezing point of —217° F. Normal pentane which freezes at —201° F. or isopentane, which freezes at —255° F. could also be used, as well as certain other liquids such as triflouro-chloroethylene, which freezes at —251° F. or ethyl chloride, which freezes at —218° F. Mixtures of the hydrocarbon gases mentioned above can also be used. As mentioned above, it is also possible to use a material such as an oil, having a solidfying temperature below the boiling point of the liquid to be stored, but which becomes very viscous at the boiling point of the latter.

The material chosen for the supporting layer to be filled into the space 14 is introduced through either or both conduits 15 or 16 at such a rate that the liquid levels within and without the tank 11 are substantially equal at all times. In the case of methane within tank 11, and butane, normal pentane or isopentane (or any other liquid having a freezing point above the boiling point of methane) in the space 14, the liquid in the space 14 freezes quickly after it comes in contact with that portion of the tank walls below the level of the material within the tank. As the material in space 14 freezes it of course provides firm mechanical support for the walls of tank 11, transmitting the stresses thereof to the membrane 13 and solid insulation 12. At the same time, the material in the space 14 serves as additional insulation, thus assisting in the task of maintaining the stored material in its liquid condition.

The material in space 14 must, of course, be such as to permit normal expansion of the tank 11 as the low temperature material within the tank is removed. Thus, if a liquefied gas, or a mixture of such gases, is used in the space 14 it should be one which has a freezing point not too much higher than the boiling point of the material stored in tank 11 so that as the latter material is removed, the frozen layer in the space 14 will rapidly melt, permitting the tank to expand. In the case of a viscous liquid, the viscosity naturally decreases as the temperature rises, thus permitting normal expansion of the tank.

In carrying out the method of the present invention, the tank 11 will be put into service by circulating cold gas therein, or by spraying the liquid to be stored slowly on the inner walls of the tank, so as to bring the temperature down gradually to near its operating value. During this step of the method, the inner tank will shrink in size leaving the peripheral space 14 around the sides and top of the tank. At this point the liquid cargo is pumped into the tank 11 and the normally fluid material chosen to be used as insulation in the space 14 is pumped into that space at such a rate that the liquid levels within the inner tank and peripheral space will rise at the same rate, thereby keeping approximately the same fluid pressures on either side of the inner tank walls. The liquid insulation will soon freeze to ice or will stiffen or solidfy, and will provide mechanical support for the walls of the tank 11, and will also prevent the same from shifting within the vessel or vehicle in which it is being transported. Thus the tank may be made much lighter and much less expensively, than has heretofore been the case.

Having thus described the invention, what is claimed as new and desired to be secured by Letters Patent is:

1. Method of storing liquefied gases, comprising the steps of cooling a storage container made of heat conductive material to approximately the boiling point of the liquefied gas to be stored, introducing the said liquefied gas into said contained and simultaneously forming a supporting layer of normally fluid material about the exterior side walls of said container by introducing into a peripheral space surrounding said walls a liquid consisting of a normally fluid material having a solidifying temperature not substantially lower than the boiling point of said liquefied gas and maintaining said normally fluid material in contact with said side walls, said supporting layer being increased in elevation correspondingly as the level of liquefied gas within said container rises, whereby the material of said supporting layer becomes sufficiently transformed toward its solid phase to provide substantial mechanical support for said side walls.

2. Method according to claim 1, said normally fluid material consisting of a liquefied gas having a freezing point not lower than the boiling point of the liquefied gas within the container.

3. Method according to claim 2, said gas to be stored consisting of methane and said normally fluid material being a member of the group consisting of butane, pentane, isopentane, mixtures thereof, trifluoro-chloroethylene and ethyl chloride.

4. Method according to claim 1, said normally fluid material consisting of an oil having very high viscosity at temperatures approximating the boiling point of the liquefied gas within the container.

5. Device for storage of liquefied gas comprising an inner container made of heat conductive material which contracts when cooled, an outer container, an envelope of solid heat insulating material within said outer container and surrounding but spaced from said inner container, filler and vent means for said inner container, a supporting layer of solidified, normally fluid material in continuous phase within the space between the outer walls of said inner container and the inner surface of said envelope, said layer extending upwardly to and terminating at the level of the surface of the liquefied gas in said inner container, and filler and vent means communicating with said space.

6. Device according to claim 5, including a substantially liquid-tight membrane covering the inner surface of said envelope at least over the sides and bottom thereof.

References Cited in the file of this patent
UNITED STATES PATENTS

| | | |
|---|---|---|
| 1,478,479 | Lachmann | Dec. 25, 1923 |
| 2,293,263 | Kornemann et al. | Aug. 18, 1942 |
| 2,687,618 | Bergstrom | Aug. 31, 1954 |
| 2,798,364 | Morrison | July 9, 1957 |
| 2,800,249 | Beckwith | July 23, 1957 |
| 2,834,187 | Loveday | May 13, 1958 |
| 2,863,297 | Johnson | Dec. 9, 1958 |
| 2,871,669 | Mann et al. | Feb. 3, 1959 |
| 2,882,694 | Arend et al. | Apr. 21, 1959 |
| 2,897,657 | Rupp | Aug. 4, 1959 |
| 2,929,221 | Clauson | Mar. 22, 1960 |
| 2,933,902 | Howard | Apr. 26, 1960 |